US009001367B2

(12) United States Patent
Okazawa

(10) Patent No.: US 9,001,367 B2
(45) Date of Patent: Apr. 7, 2015

(54) IMAGE FORMING APPARATUS HAVING NETWORK INTERFACE AND INTERFACE ENABLING TO CONNECT PERIPHERAL DEVICE

(71) Applicant: Canon Kabushiki Kaisha, Tokyo (JP)

(72) Inventor: Takashi Okazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/863,586

(22) Filed: Apr. 16, 2013

(65) Prior Publication Data

US 2013/0286434 A1  Oct. 31, 2013

(30) Foreign Application Priority Data

Apr. 25, 2012 (JP) .................................. 2012-100154

(51) Int. Cl.
*H04N 1/00* (2006.01)
*H04N 1/32* (2006.01)

(52) U.S. Cl.
CPC ....... *H04N 1/00129* (2013.01); *H04N 1/32502* (2013.01)

(58) Field of Classification Search
CPC . H04N 1/00; H04N 1/00002; H04N 1/00037; H04N 1/00127; H04N 1/00129; H04N 1/32; H04N 1/32502
USPC .......... 358/1.1, 1.14, 1.15, 400, 407, 442, 444
See application file for complete search history.

(56) References Cited

U.S. PATENT DOCUMENTS

2008/0037050 A1* 2/2008 Sasaki ........................ 358/1.13
2010/0318829 A1* 12/2010 Tamura ......................... 713/340

FOREIGN PATENT DOCUMENTS

JP  2008-48048 A  2/2008

* cited by examiner

*Primary Examiner* — Thomas D Lee
(74) *Attorney, Agent, or Firm* — Carter, DeLuca, Farrell & Schmidt, LLP

(57) ABSTRACT

An image forming apparatus, which comprises a local interface, a network interface, and a relay unit for extracting control data for a peripheral device connected with the local interface from a packet received from the network interface and inputting the extracted control data to a local interface control unit, receives in-abnormality control command data for controlling the connected peripheral device to be performed in case of network disconnection from an information processing apparatus and stores it in a memory, inputs the stored in-abnormality control command data to the local interface control unit in case of detecting an abnormal situation such as the network disconnection from the information processing apparatus, and causes the local interface control unit to control the peripheral device according to the detected abnormal state. Thus, it is possible to achieve intelligent control to the peripheral device even in occurrence of the network disconnection.

4 Claims, 4 Drawing Sheets

IMAGE FORMING APPARATUS HAVING NETWORK INTERFACE AND INTERFACE ENABLING TO CONNECT PERIPHERAL DEVICE

BACKGROUND OF THE INVENTION

1. Field of the Invention

The present invention relates to an image forming apparatus which is equipped with a network interface, and further equipped with an interface by which a peripheral device can be connected.

2. Description of the Related Art

There is an image forming apparatus which is equipped with a network interface and an interface by which a peripheral device can be connected. As the image forming apparatus like this, a digital MFP (Multifunction Peripheral) which is equipped with a LAN/WAN (Local Area Network/Wide Area Network) interface and a USB (Universal Serial Bus) interface and serves as a USB host has been widely known.

Further, there is a technique which controls a USB device connected with a USB connector for serving as a USB client. Furthermore, there is a technique which, in an apparatus with which a USB device is connected, directly controls the USB device in response to an instruction from a dedicated USB device controlling application running in the apparatus.

In addition to these techniques, a technique which controls a USB device from an information processing apparatus connected with the USB device through a network has been known. More specifically, as the relevant technique which controls the USB device through the network, a USB Over IP™ technique has been known. Incidentally, "USB Over IP™" will be simply called "USB Over IP" hereinafter.

In the USB Over IP technique, an information processing apparatus which controls a USB device and a USB device connection apparatus with which the USB device to be controlled is connected are connected with each other through an IP (Internet Protocol) network. Further, data which is to be exchanged in communication between the information processing apparatus which controls the USB device and the USB device is capsuled on an IP packet and then transmitted, and the USB device is actually controlled on the basis of the transmitted data.

Incidentally, Japanese Patent Application Laid-Open No. 2008-048048 discloses the technique which controls a USB device, and the technique which controls a USB device from a network.

As previously described, there is the USB Over IP technique which controls the USB device from the network. The USB device connection apparatus (also called the MFP hereinafter) to which the USB Over IP technique has been implemented does not need to have application software which is used to control in detail the USB device connected with the USB host connector on the USB device connection apparatus. This is because the information processing apparatus, which is connected by the network, performs the whole and detailed control dedicated to the USB device on the network.

However, in a case where the network-connected information processing apparatus like this goes down (including a case where the network is disconnected), it becomes of course impossible to use the USB device completely. Under the circumstances, although the USB device side has been electrified, the software itself which actively operates the USB device has become non-existent.

SUMMARY OF THE INVENTION

Therefore, an object of the present invention is to solve such a problem as described above.

To achieve the above object, an image forming apparatus according to present invention is characterized by comprising: a USB interface configured to communicate with a display device; a network interface configured to communicate with an information processing apparatus through a network; a relay unit configured to extract USB data for the display device connected with the USB interface from a packet received from the network interface, and input the extracted USB data to the USB interface; and a control unit configured to, in a case where it is detected that network connection with the information processing apparatus is disconnected, control the display device by inputting a command not for displaying a screen currently displayed on the display device to the USB interface.

Thus, it becomes possible on the side of the image forming apparatus to reduce a disadvantage that a user suffers when an abnormal situation occurs in a network, while maintaining the essential advantage of the USB Over IP technique capable of eliminating the need for detailed control functions according to the USB device.

Further features of the present invention will become apparent from the following description of exemplary embodiments with reference to the attached drawings.

DESCRIPTION OF THE EMBODIMENTS

Hereinafter, preferred embodiments of the present invention will be described in detail in accordance with the accompanying drawings.

Initially, it should be noted that the present embodiment supposes the following case. That is, in a case where an information processing apparatus which has been connected through a network goes down (including a case where the network itself is disconnected), it becomes impossible to use a USB device completely. In this condition, although the USB device side has been electrified, the USB device is in a state that there is no software for dynamically activating it.

Incidentally, the following cases are conceivable as examples.

(1) In a Display Apparatus which Performs Display in Response to an External Instruction It is conceivable that an LCD (liquid crystal display) touch panel apparatus (hereinafter, called a USB panel) is used as a display device which is connected with a USB. In this case, while the state of an MFP device is being monitored on the side of the information processing apparatus through a network, display on the USB panel connected with the MFP device is switched, and an input process is performed from the USB panel. Here, if the network is suddenly disconnected during operations, the USB panel comes into the state that the content displayed at the time of disconnection of the network is held as it is. Under such a circumstance, if a message "printable" is displayed, it is impossible to display a message "there is no paper" even if the state of the MFP device has changed from the printable state to the state that there is no paper. Further, it is impossible at the time to perform the input process from the USB panel. Such a situation might cause misunderstanding to users, whereby convenience for the users is impaired.

(2) In a Secondary Storage Apparatus

It is conceivable that a USB flash memory or a USB hard disk is used as the secondary storage apparatus which is connected with the USB. As well as the above case (1), if the network is suddenly disconnected during accessing the secondary storage apparatus (particularly, during data writing to the secondary storage apparatus), there is a risk that the file system in the second storage apparatus is destroyed. In addition, there is a risk that it becomes impossible for the user to use the secondary storage apparatus thereafter due to such destruction of the file system.

In the above cases, the state of the USB device depends on timing at which the information processing apparatus goes down (including timing at which the network is disconnected). Consequently, it is necessary to properly control the operation to be performed in these cases to prevent disadvantages for the user.

However, since the MFP device does not have application software (i.e., a device driver) for controlling in detail the USB device, there is a problem that it is impossible to achieve intelligent control when an abnormality occurs.

Figure 1:
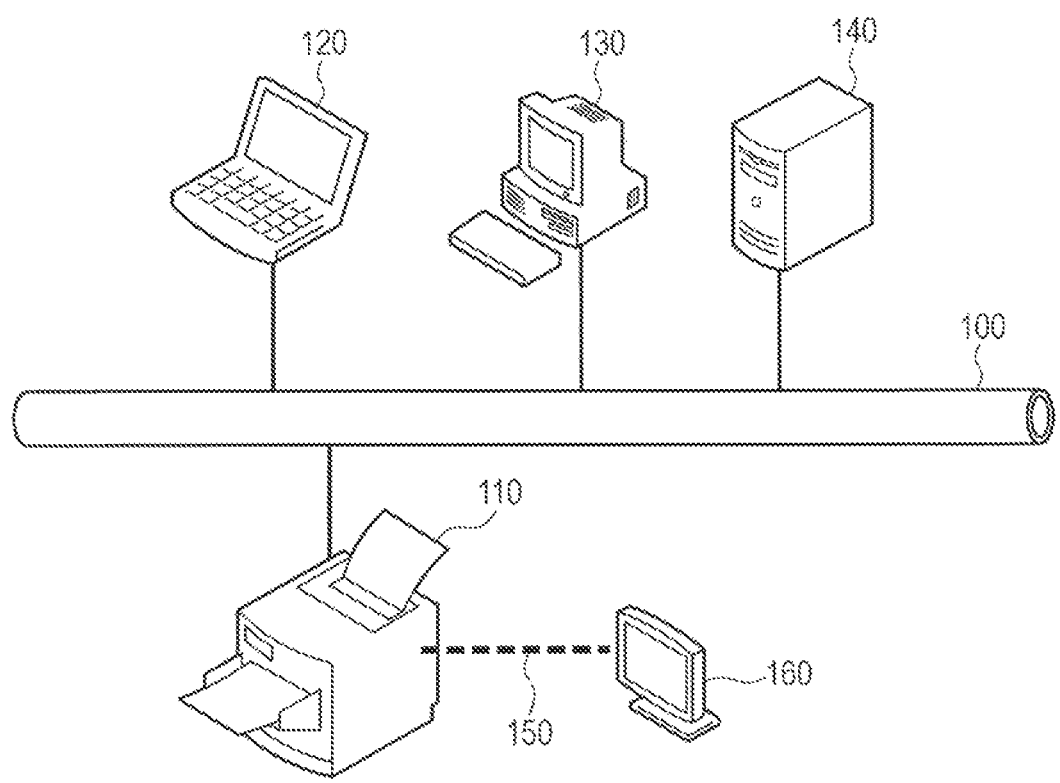
FIG. 1 is a diagram illustrating a network connection configuration according to the embodiment of the present invention.

FIG. 1 is a diagram for describing a configuration of a USB Over IP system according to the embodiment of the present invention. First, in this system, a USB device 160 (e.g., a touch panel display serving as a peripheral unit) is connected with an MFP 110 serving as the image forming apparatus in a USB local connection manner by means of a USB cable 150 serving as a local interface. It should be noted that the present invention mainly aims to properly control this USB device. Incidentally, the MFP 110 is connected with an IP network 100 such as a LAN (local area network) or the like, and thus can be further connected with a PC (personal computer) serving as the information processing apparatus, various kinds of servers and the like on the network. Further, a PC 120 is a print client which transmits a print instruction to the MFP. Furthermore, a PC 130, in which an application for administrating the MFP operates, administrates various kinds of use information (charging information and the like). Furthermore, a server 140 serving as a USB Over IP server controls the USB device 160 through the network.

Figure 2:
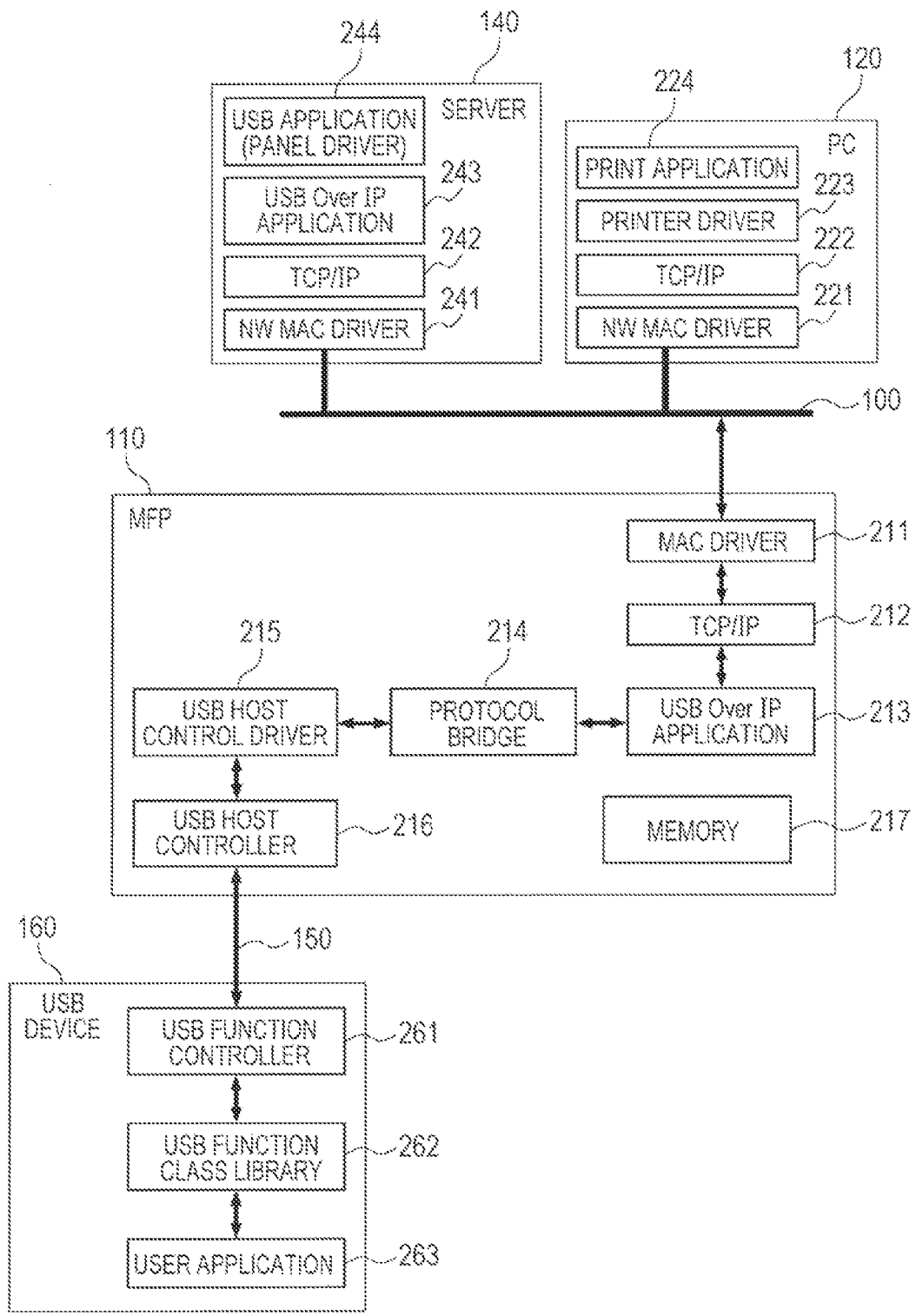
FIG. 2 is a block diagram for describing a system constitution in a USB Over IP system according to the embodiment of the present invention.

FIG. 2 is a block diagram for describing the system constitution in the USB Over IP system according to the embodiment of the present invention. As illustrated in FIG. 1, the MFP 110 is connected with the USB device 160 in the USB local connection manner, and the MFP 110 can communicate with the PC 120 serving as the print client and the server 140 serving as the USB Over IP server through the network 100.

Hereinafter, the MFP 110 will be described in detail. The MFP 110 includes a USB host controller 216 serving as a local interface control unit and a USB host control driver 215 having a USB host function, to establish USB host connection. The USB host controller 216, which constitutes a USB interface, is controlled by the USB host control driver 215 to generate a communication signal in a USB form, and output the generated communication signal to the external USB device 160. Further, the USB host controller transmits USB data input from the USB host control driver 215 to the USB device which has been designated as the destination of the input USB data. Here, it should be noted that this USB data is the control data for controlling the USB device. Furthermore, the USB host controller 216 communicates with the USB device, receives a communication signal transmitted from the USB device, and inputs the received USB data to the USB host control driver 215.

In a case where the USB local device is normally controlled, there is a control path through which the USB host control driver 215 is controlled from a USB host application. However, since the USB Over IP function takes on such a USB host application function, the above USB host application does not actually exist, whereby the control path serves as a communication control path for controlling communication from the network. Such an operation is performed by a protocol bridge 214 provided between the USB device and the network.

The network 100, which is the IP network, transmits the protocol of the USB Over IP system to the MFP 110 through a MAC (Media Access Control) protocol layer (MAC driver) 211 and a TCP/IP (Transmission Control Protocol/Internet Protocol) protocol layer (TCP/IP) 212. Handling of the protocol of the USB Over IP layer is performed by a USB Over IP application 213 serving as a relay unit. More specifically, the USB data included in a TCP/IP packet is extracted from the TCP/IP packet, and the extracted USB data is input to the protocol bridge 214 serving as the network interface, so that the input USB data is transmitted to the USB device which is the destination of the relevant USB data. Further, the USB data input from the protocol bridge 214 is packetized, and such a TCP/IP packet obtained is transmitted to the network. Here, it should be noted that, in an administrative program for the USB Over IP function, correspondence relation between IP addresses and USB devices has been set. Therefore, it is possible by properly referring to the correspondence relation to achieve data transmission between the USB device and the USB Over IP function server. Although it will be described in subsequent flow charts, a memory 217 is provided for storing series of data commands to be used in an abnormal condition, whereby the USB Over IP application 213 uses the series of data commands stored in the memory according to need.

Next, the USB device 160 will be described. Incidentally, a kind of USB device is no object here. A USB function controller 261 controls lower-layer data transmission in the USB connection between the USB device and the USB host controller 216 in the MFP 110. A USB function class library 262 transmits data input from the USB function controller 261 to a device control function in the USB device 160. The upper application for performing communication includes a plurality of classes, and data transmission is performed with the upper application. A user application 263 is to control the USB device 160 on the basis of the data input from the USB function class library 262. For example, in a case where the USB device 160 is a touch panel, if a display instruction is issued from the side of the USB function class library 262 to the touch panel, the display instruction is concretely output as an image on the touch panel. On the other hand, if the data is input from the touch panel, such input information is output to the side of the USB function class library 262.

Next, the constitution of the server (USB Over IP server) 140 which is used for USB Over IP control and is connected with the MFP 110 through the network 100 will be described. Here, it should be noted that the constitution of the USB Over IP server is not especially different from a hardware constitution of a normal PC. In the USB Over IP server, a USB Over IP application 243 controls, through the network, the USB device 160 connected with the MFP 110, in response to an instruction issued from a USB application (panel driver) 244 installed in the server. More specifically, the USB Over IP application 243 extracts the USB data included in the TCP/IP packet received through the network 100, and inputs the extracted USB data to the USB application 244 in the server. Further, the USB Over IP application packetizes the USB data input from the USB application 244 to obtain the TCP/IP packet, and transmits the obtained packet to the MFP 110 with which the USB device 160 being the destination of the USB data is connected. Furthermore, the USB Over IP application 243 is recognized and realized as a virtual USB host function operating like a USB host function (not illustrated) existing on the server 140. That is, the USB Over IP function is realized so that the USB device can be controlled through the network by the device driver for the USB device locally operating in the server. Incidentally, the TCP/IP packet is controlled by a TCP/IP 242, and the data on the network is transmitted and received to and from the server 140 by a network adapter (network interface) operating under the control of an NW MAC (Network Media Access Control) driver 241.

Incidentally, the PC 120 is not essentially relative to the USB Over IP function. Namely, the PC is a print client which causes the MFP 110 to perform print by using a print application 224 and a printer driver 223. Further, the PC 120 can perform such a print process in cooperating with the USB device connected with the MFP 110 (incidentally, if the USB device is an authentication device such as a card reader, it is necessary to further develop the function to realize an authentication print function. Furthermore, likewise, the TCP/IP packet is controlled by a TCP/IP 222, and the data on the network is transmitted and received to and from the PC 120 by a network adapter (network interface) operating under the control of an NW MAC driver 221.

Figure 3:
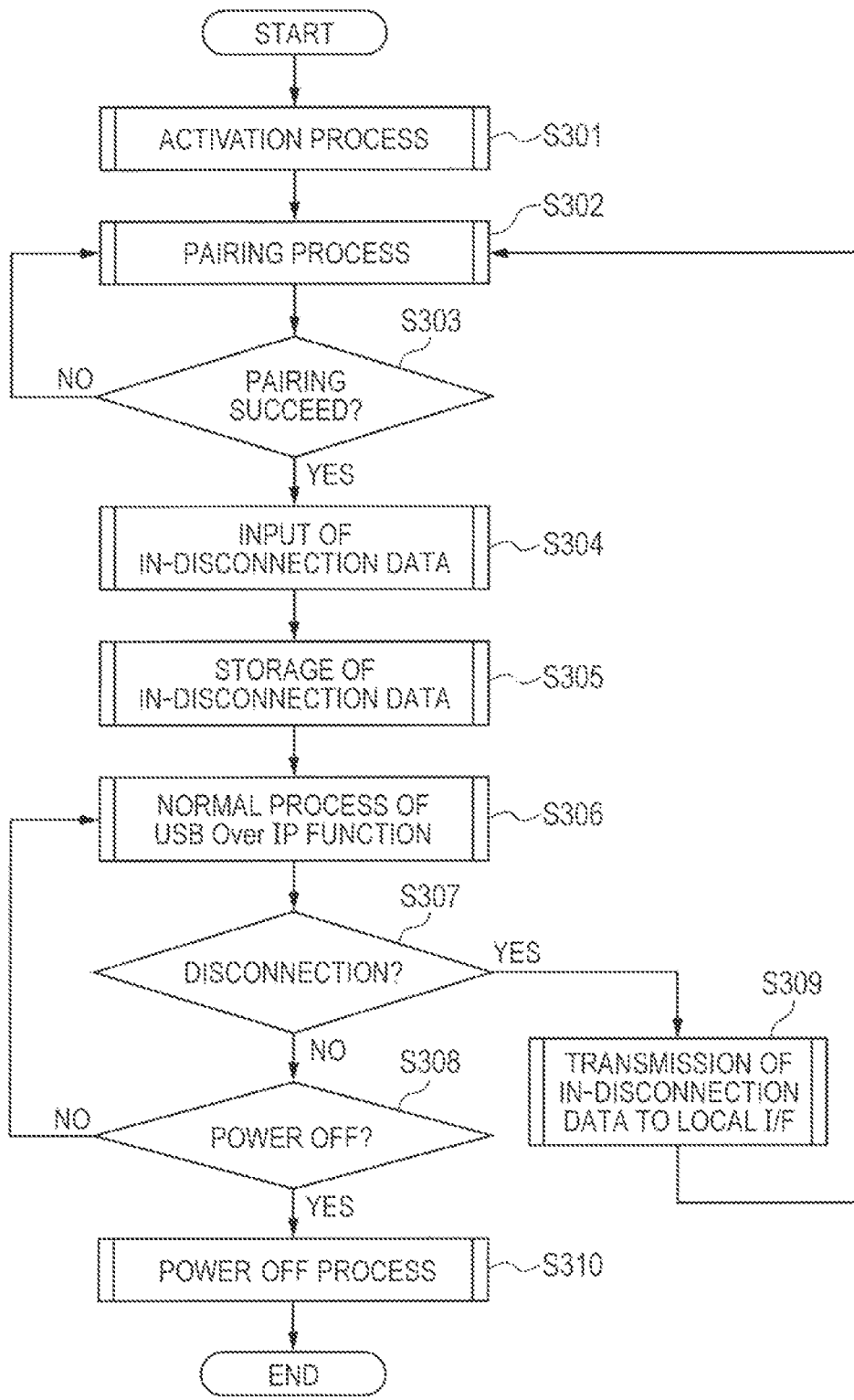
FIG. 3 is a flow chart for describing an operation which is performed by an MFP 110 according to the embodiment of the present invention.

FIG. 3 is a flow chart for describing an operation which is performed by the CPU of the MFP 110 according to the embodiment of the present invention. Initially, when the MFP 110 is activated, various kinds of activation processes are performed in S301. Among these processes, the activation process for the USB Over IP function will be described hereinafter. In this activation process, server information of the USB Over IP function already set in the device is referred and then obtained. Next, a pairing process between the MFP and the server is performed in S302. Here, it should be noted that the pairing process, which is a kind of initial network connection processes, is a process for establishing a state that communication becomes possible between the MFP 110 and the server. More specifically, in the pairing process, the USB client device is connected with the USB host function, and then various processes are performed until the state that the communication becomes possible between the MFP and the server is established. When the USB Over IP function is used, the communication of the TCP/IP network layer is established. Then, on the premise that the communication of the USB Over IP function has been established, the connection of the USB layer (plug-and-play function) is performed. Under normal conditions, since the server is in a state of always providing services, the pairing process is performed in regard to the already-set server when the MFP is activated by power on. If it is judged in S303 that the pairing process was normally completed and the pairing succeeded, the process advances to S304. In this step, the MFP requests, to the server, in-disconnection data which is used when the MFP gets into a situation such as subsequent communication abnormality or the like. In response to such a request, the server returns the in-disconnection data (series of commands) to the MFP. Then, in S305, the MFP stores the returned data in the memory 217 of the MFP. Subsequently, a normal USB Over IP process is started (S306).

In a case where the USB Over IP function is being performed, the USB data is communicated on the TCP/IP network in case of necessary. Here, it is assumed that some kind or another abnormal situation such as sudden disconnection of the network connection occurs and thus it becomes impossible to communicate with the server 140 (S307). For example, there is a case where response is not returned in regard to an inquiry to the server 140, a case where it is detected that a network packet is not transmitted or received for a predetermined period of time, a case where a LAN cable is pulled out, or the like. In the case like this, it is determined in S307 that the communication abnormality cannot finally be restored, and the process advances to S309. Then, the pairing process is performed, and thereafter the series of commands (in-disconnection data) previously received from the server 140 and stored in the memory 217 are transmitted to the USB device (S309). This process is also called transmission of in-disconnection data to local I/F (interface).

Incidentally, in a case where the USB device is, e.g., a display device, the in-disconnection data is equivalent to the series of commands to be used for turning the screen which is being displayed off.

After then, any process is not performed to the USB device, and a next pairing process is started. If the pairing is established, the normal USB Over IP process is performed. On the other hand, if the abnormal situation is not detected in S307, it is then judged in S308 whether or not to perform a power off process for the MFP. If it is judged not to perform the power off process, then the process returns to S306, and the USB Over IP function process is continuously performed. On the other hand, if it is judged in S308 to perform the power off process, the process advances to S310 to perform the power off process of canceling the pairing between the server 140 and the USB Over IP function as a normal end, and then completing the process as the MFP.

In the operation that the stored series of commands (in-disconnection data) is transmitted to the USB device (S309) in the abnormal situation, a communication state with the USB device in a normal situation has been maintained. For this reason, the USB Over IP application 213 transmits the data from the memory 217, that is, not the data from the network, to the USB device. By doing so, it is possible to transmit the data through the protocol bridge 214.

However, it is conceivable that the operation of the USB Over IP application 213 cannot be continued according to a disconnection condition in the abnormal situation. In such a case, the abnormality situation is detected by an internally provided monitoring mechanism, and, if it is judged by the monitoring mechanism that the abnormal situation has occurred, the USB host control driver 215 transmits the stored series of commands (in-disconnection data) to the USB device.

Incidentally, in a case where a situation that the series of commands (in-disconnection data) to be transmitted when the abnormality occurs cannot at all be transmitted in S309 is detected, electrifying to the USB device may be stopped. Further, in a case where pairing is not established and a control command to be used when the abnormality occurs is not input, electrifying to the USB device may be stopped.

Furthermore, after the series of commands (in-disconnection data) to be transmitted when the abnormality occurs can be normally transmitted to the USB device, electrifying to the USB device may be stopped.

Incidentally, in the above normal process of the USB Over IP function (S306), mere a communication path is formed on the network. For this reason, to actually transmit and receive the USB data between the USB device 160 and the server 140, it is necessary to perform a plug-and-play process in the USB at the time when the USB device is connected with the MFP by using the formed communication path. Since the plug-and-play process to be performed in this case is the same as plug-and-play to be performed in a communication path of a normal local USB interface, the detailed description thereof will be omitted.

Incidentally, it is possible to detect the communication-abnormality situation in the MFP by detecting a connection time-out period in the USB Over IP application 213. In addition, it is also possible to detect the communication-abnormality situation by the operation of the USB Over IP application 213 of receiving communication disconnection in the TCP/IP network layer as an event.

Figure 4:
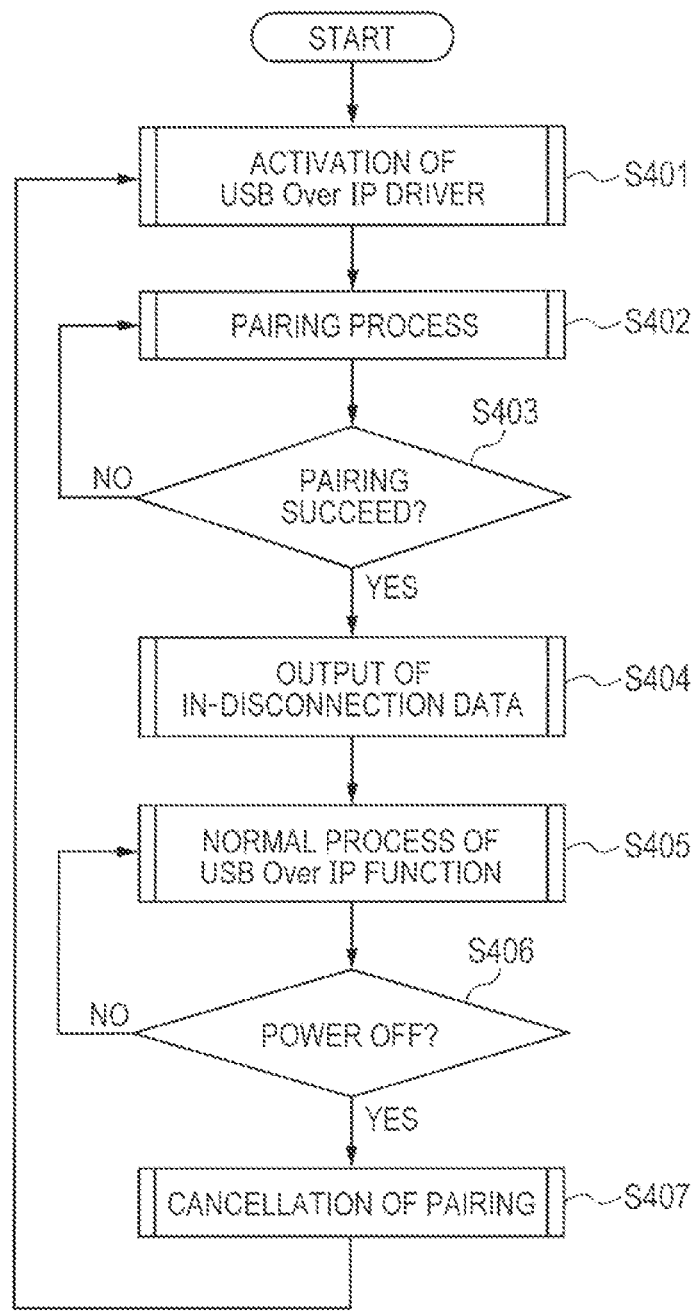
FIG. 4 is a flow chart for describing an operation which is performed by a server 140 according to the embodiment of the present invention.

FIG. 4 is a flow chart for describing the operation which is performed by the server 140 according to the embodiment of the present invention. Initially, when the connection process (pairing) is requested from the MFP 110, the server 140 starts the process of the USB Over IP function. However, before actually performing the process of the USB Over IP function, preparation is necessary on the side of the USB Over IP system for enabling to start the USB Over IP function. It should be noted that such a preparation process is an activation process of the driver of the USB Over IP function to be performed in S401. More specifically, handling is performed to a network port so as to be able to receive the request of the pairing from the network. Further, on the occasion of the pairing, the information which indicates whether or not the target MFP is the MFP to which the pairing should actually be allowed has already been registered. Thus, the driver activation process of the USB Over IP is performed by using such registered setting information. Next, in S402, the processes subsequent to the request of the pairing from the MFP 110 are performed. More specifically, the pairing process is performed on the basis of the above registered information indicating the pairing-allowed MFP, and the contents of the communication with the MFP at that point in time. As a result, if it is judged in S403 that the pairing process was normally completed and the pairing succeeded, the process advances to S404. In this step, in response to a request from the MFP for obtaining command data to be used when an abnormality occurs, in-abnormality command data to be used when the abnormality occurs is output and returned to the MFP. Then, in S405, a normal process of the USB Over IP function is performed. Incidentally, if it is judged in S406 to perform a power off process from the MFP, the process advances to S407 to cancel the pairing as a normal end. Thereafter, the process returns to the initial process in S401, thereby waiting for the process of the pairing.

Incidentally, the in-abnormality command data in S404, which has been yet transmitted, has the content of the command which should be performed by the device at the very least. That is, any command is not further transmitted based on the response from the device. In other words, the relevant command data is the command which is one-sidedly transmitted once and used to control the device at the very least. Consequently, the MFP 110 which intervenes between the server and the USB device does not refer and estimate the content of the command, that is, the MFP is used to merely transfer the command. For this reason, it is necessary to previously prepare the content of the control command like this on the server 140. In other words, the relevant command is prepared as a part of the application (i.e., driver software of the USB device) simultaneously when the USB application is created.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100154, filed Apr. 25, 2012, which is hereby incorporated by reference herein in its entirety.

What is claimed is:

1. An image forming apparatus comprising:
   a universal serial bus (USB) interface configured to communicate with a display device;
   a network interface configured to communicate with an information processing apparatus through a network;
   a relay unit configured to extract USB data for the display device connected with the USB interface from a packet received from the information processing apparatus through the network interface, and input the extracted USB data to the USB interface; and
   a control unit configured to, in a case where it is detected that a network connection with the information processing apparatus is disconnected, control the display device by inputting a control command for turning off a screen currently displayed on the display device to the USB interface, the control command being transmitted from the information processing apparatus when the network connection is connected.

2. The image forming apparatus according to claim 1, further comprising a storage control unit configured to, when the network connection with the information processing apparatus is connected, store the control command in a storage unit.

3. The image forming apparatus according to claim 2, further comprising a unit configured to, in the case where it is detected that the network connection with the information processing apparatus is disconnected, input the control command stored in the storage unit to the USB interface, and thereafter stop delivery of power to the USB interface.

4. The image forming apparatus according to claim 1, wherein the image forming apparatus has a USB over Internet protocol (IP) function, being performed by a USB over IP application serving as the relay unit.

* * * * *